United States Patent [19]

Sakakibara

[11] Patent Number: 4,536,691
[45] Date of Patent: Aug. 20, 1985

[54] METHOD OF CONTROLLING A STEPPING MOTOR

[75] Inventor: Kenji Sakakibara, Nagoya, Japan

[73] Assignee: Brother Kogyo Kabushiki Kaisha, Nagoya, Japan

[21] Appl. No.: 535,948

[22] Filed: Sep. 26, 1983

Related U.S. Application Data

[63] Continuation-in-part of Ser. No. 285,356, Jul. 20, 1981, abandoned.

[51] Int. Cl.³ ............................................. H02K 29/04
[52] U.S. Cl. ..................................... 318/696; 318/685
[58] Field of Search .................................. 318/696, 685

[56] References Cited

U.S. PATENT DOCUMENTS 4,426,608 1/1984 Larson et al. ...................... 318/685
4,469,995 9/1984 Chiang et al. ...................... 318/685

Primary Examiner—William M. Shoop, Jr.
Assistant Examiner—Saul M. Bergmann
Attorney, Agent, or Firm—Moonray Kojima

[57] ABSTRACT

A stepping motor having a plurality of phase windings and a rotor which is driven toward a desired position with selective variations of the lead interval between the energized phase windings and the current rotational position of the rotor. Two of the phase windings are alternately selected in a predetermined sequence for strongly accelerating or decelerating the rotor, and only one of the phase windings is energized while the rotor is rotated at a constant speed or is held at any rest position. Thus, the rotor is driven to the desired position in a short time and a substantial amount of power which is supplied to the phase windings for driving the rotor is saved.

12 Claims, 43 Drawing Figures

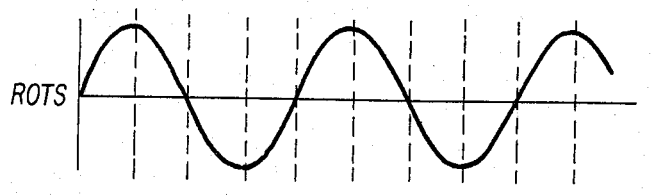
FIG. 6A  ROTS
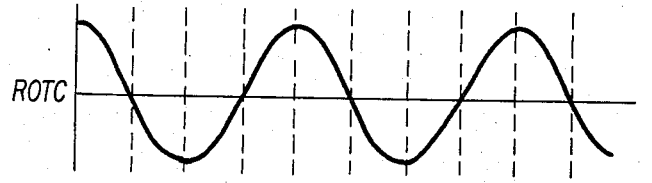
FIG. 6B  ROTC
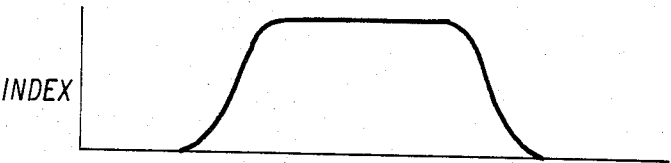
FIG. 6C  INDEX
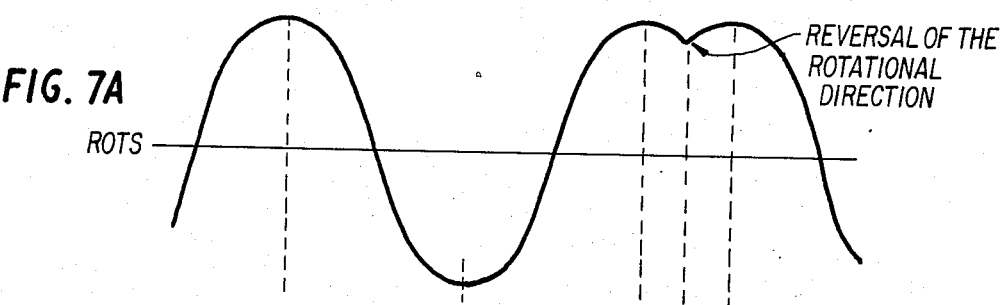
FIG. 7A  ROTS
REVERSAL OF THE ROTATIONAL DIRECTION
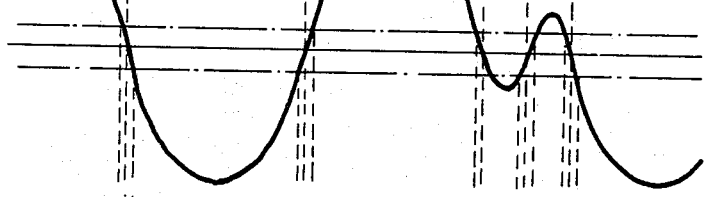
FIG. 7B
FIG. 7C  PLUS
FIG. 7D  MINUS
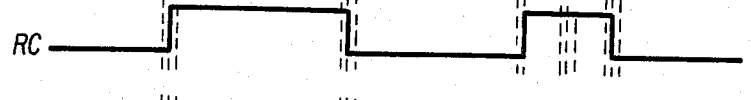
FIG. 7E  RC
FIG. 7F  DIR1
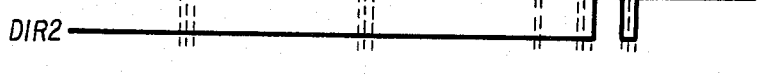
FIG. 7G  DIR2

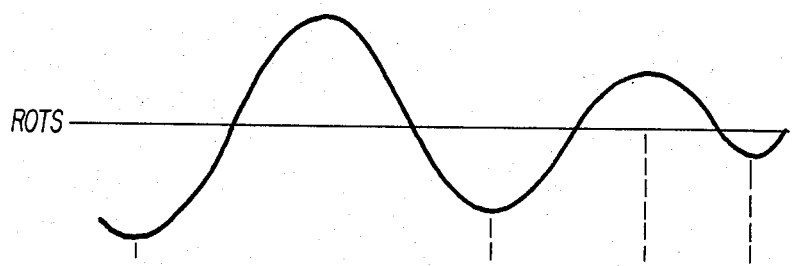
FIG. 17A  ROTS
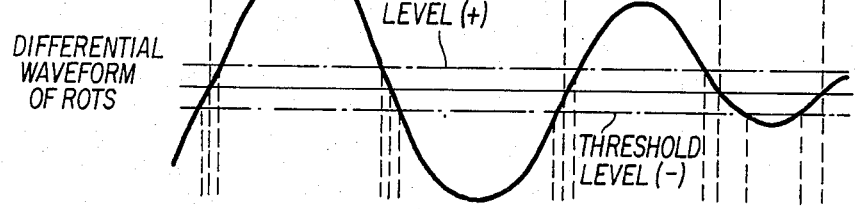
FIG. 17B
FIG. 17C  PLUS
FIG. 17D  MINUS
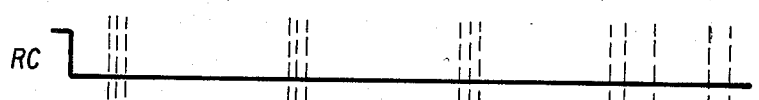
FIG. 17E  RC
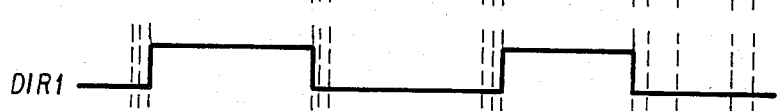
FIG. 17F  DIR1
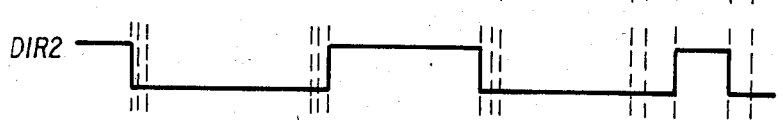
FIG. 17G  DIR2
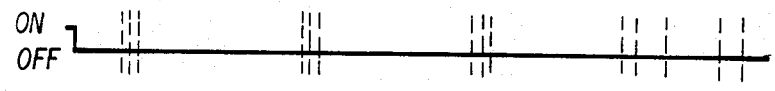
FIG. 17H  PHASE A  ON/OFF
FIG. 17I  PHASE B  ON/OFF
FIG. 17J  PHASE C  ON/OFF
FIG. 17K  PHASE D  ON/OFF

METHOD OF CONTROLLING A STEPPING MOTOR

This is a continuation-in-part of Ser. No. 285,356 filed July 20, 1981, now abandoned.

BACKGROUND OF THE INVENTION

1. Field of the Invention

This invention relates to a method of controlling a stepping motor and more particularly to a method for rapidly, accurately and effectually driving a rotor of a stepping motor in response to the position of the rotor.

2. Description of the Prior Art

In stepping motors of the type with which this invention is concerned, the motor generally consists of a rotor adapted for connection to a mechanical load and a stator having a number of phase windings. As an example, consider a printer wherein one stepping motor can be used to perform vertical indexing of a paper line feed and another stepping motor can be used for rotation of a disc-shaped print wheel. A suitable electrical drive logic or control unit operates to selectively energize the windings in such a manner as to create an internal magnetic field which produces a torque that urges the rotor to assume a mechanical position in line with the resultant magnetic field. The drive logic supplies the motor with advance pulse signals and changes the energization of the windings in a sequential step-by-step fashion, to cause the magnetic field to move in a similar step-by-step fashion.

In general, two methods are known for driving stepping motors. One method involves supplying advance pulse signals to only one phase winding at a time. The other method involves supplying advance pulse signals to selected two or more phase windings simultaneously. In the first method, there is produced less torque for operating the rotor, than in the second method. Thus, using the first method, it is difficult to rapidly accelerate and decelerate rotation of the rotor in the process of driving the rotor to a desired position in a short period of time. In the second method, the rotor is strongly rotated. However, disadvantageously, in the second method, electric power is dissipated as unrequired heat, more so than is the case using the first method.

SUMMARY OF THE INVENTION

It is therefore an object of the invention, to provide an improved method of controlling stepping motors.

Another object is to provide a stepping motor control method which is reliable and which does not require the use of special electronic devices and circuits.

A further object is to strongly and effectually accelerate and decelerate and rapidly stop, a stepping motor.

A still further object is to control the amount of power supplied to a stepping motor.

The foregoing and other objects and advantages of the invention are attained in an illustrative embodiment encompassing a system comprising a stepping motor having a plurality of phase windings and a rotor, a circuit for detecting the rotational position and speed of the rotor, and a control circuit coupling the motor and the detecting circuit in order to drive the rotor toward a desired position in response to an input command signal. The rotor is held in any one of a plurality of stable stopping positions provided at intervals of one step. Each of the stable positions is defined by one of the phase windings. The control circuit sequentially energizes either one phase winding or two phase windings with variations of the lead interval between the energized phase and the current position of the rotor. The control circuit energizes two phase windings for driving the rotor acceleratively or deceleratively, and energizes only one phase winding for driving the rotor at a constant speed and for holding it at any one of a plurality of stable stopping positions.

BRIEF DESCRIPTION OF THE DRAWINGS

FIGS. 6A through 6C depict waveform charts showing the output signal of the light sensing element;

FIGS. 7A through 7G depict signal waveform charts explaining discrimination between rotational directions of the stepping motor;

FIGS. 17A through 17K depict signal waveform charts explaining deceleration control at a stop position.

DESCRIPTION OF THE PREFERRED EMBODIMENTS

Figure 1:
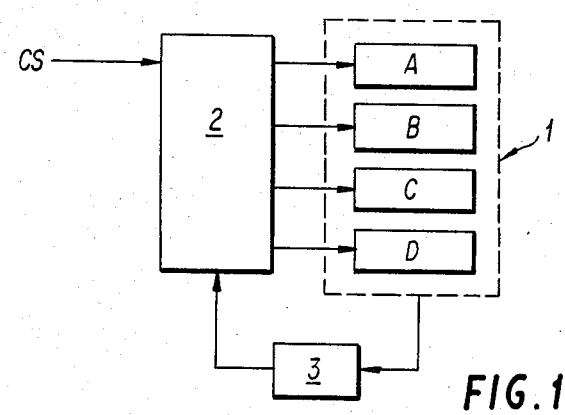
FIG. 1 depicts a schematic block diagram of an illustrative preferred embodiment of the invention encompassing a control system thereof.

In FIG. 1, a multipole stepping motor 1 includes four phase windings A, B, C and D, which are selectively energized by an electronic control circuit 2. The rotational position and speed of the stepping motor 1 are sensed by a detecting circuit 3, and fed back to the electronic control circuit 2. Electronic control circuit 2 is basically made up of a microprocessor and memory devices (ROM and RAM) performing stepping motor control of this invention in accordance with a specified program and an input command signal (CS) which gives the number of steps of the movement.

The details of FIG. 1 will now be described with reference to FIGS. 2 through 7.

Figure 2:
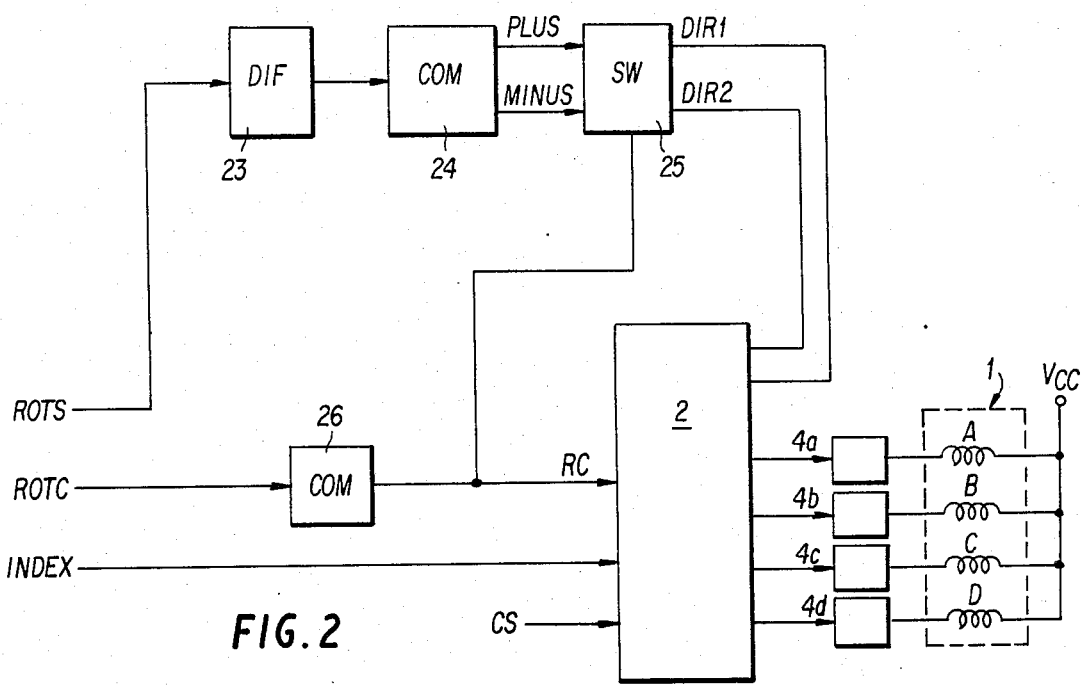
FIG. 2 depicts a detailed block diagram of the control system depicted in FIG. 1.
Figure 4:
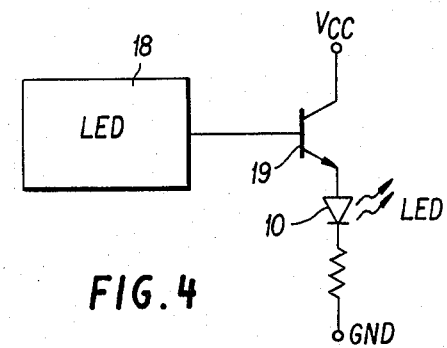
FIG. 4 depicts a connecting diagram of a circuit for driving a light emitting element.
Figure 3:
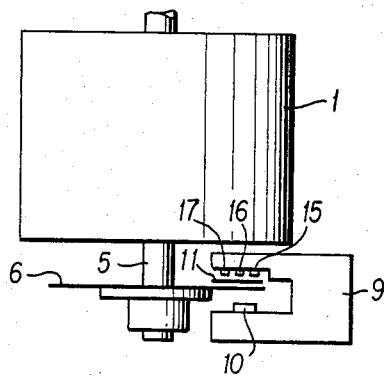
FIG. 3 depicts a stepping motor to which an optical encoder may be attached.
Figure 3A:
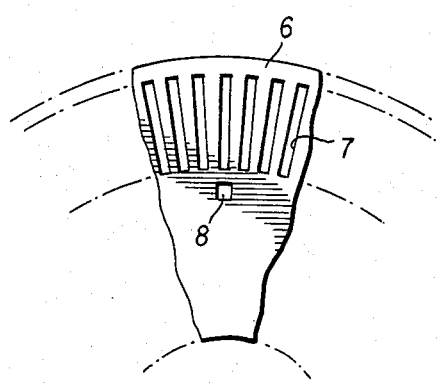
FIG. 3A depicts a rotary disk of the optical encoder.
Figure 3B:
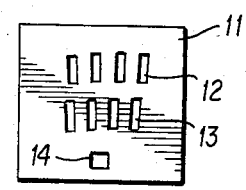
FIG. 3B depicts a stationary slit plate of the optical encoder.
Figure 5A:
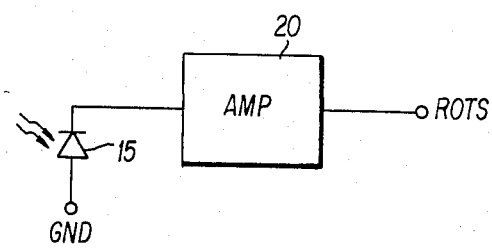
FIGS. 5A through 5C are connecting diagrams for processing the output signal of a light sensing element.
Figure 5B:
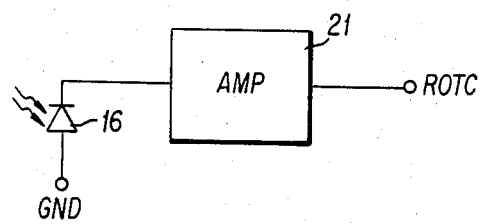
Figure 5C:
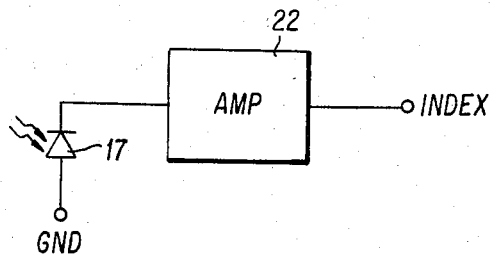

The electronic control circuit 2 energizes excitation phases A-D sequentially via drivers 4a-4d (see FIG. 2) in response to an input command signal CS, thereby driving stepping motor 1. As illustrated in FIGS. 3, 3A and 3B, stepping motor 1 is equipped with a rotary disk 6 secured to a rotary shaft 5 thereof. A slit row 7 comprising a plurality of long slits and an index slit 8 are formed at the periphery of rotary disk 6, and a stationary member 9 is disposed opposite thereto. A light emitting element 10 comprising a light emitting diode (LED) is secured to a portion of stationary member 9 opposed to slit row 7. A stationary slit plate 11 is provided fixedly at a position of stationary member 9 opposed to slit row 7 and light emitting element 10. Stationary slit plate 11 has a signal slit 14 and two slit rows 12 and 13 comprising a plurality of short slits and having pitch deviation of 90° from each other. The plurality of slits mentioned above are so arrayed that, with rotation of rotary disk 6, slit rows 12 and 13 move to confront slit row 7 while slit 14 moves to confron slit 8, respectively. Light sensing elements 15,16 and 17, comprising photodiodes, are provided at positions opposite slit rows 12,13 and 14 of stationary member 9, respectively. As illustrated in FIG. 4, light emitting element 10 is placed in operation by a transistor 19 which is kept energized by a driver 18. Meanwhile, light sensing elements 15,16, and 17 produce output signals ROTS, ROTC and INDEX at output terminals via amplifiers 20,21, and 22, respectively, as illustrated in FIGS. 5A throug 5C. The output signals obtained in accordance with rotation of rotary disk 6 are shown in FIGS. 6A through 6C, wherein a 90° phase difference exists between signals ROTS and ROTC. As illustrated in FIG. 2, signal ROTS (FIG. 7A) is processed to become a signal of FIG. 7B via a differentiator 23 composed of a resistor and a capacitor, and is subsequently converted by a comparator 24 with hysteresis characteristics to digital signals PLUS and MINUS (FIGS. 7C and 7D) which are then fed to a switch circuit 25. The signals PLUS and MINUS are selectively switched by means of switch circuit 25 through the use of, as a control signal, a position signal RC (FIG. 7E) obtained by digitizing the signal ROTC via comparator 26. That is, when signal RC has a low level, signal PLUS is outputted to terminal DIR2 and signal MINUS to terminal DIR1. As is apparent from a reading of FIGS. 7A thorugh 7G, two signals DIR1 and DIR2 thus obtained represent the rotational directions of stepping motor 1. This signifies that anterior to reversal of rotational direction, a high level signal is generated at output terminal DIR1 alone; and posterior to the reversal, a high level signal is generated at output terminal DIR2 alone. Thus, it becomes possible to always detect the rotational direction of the stepping motor from the signals obtained at output terminals DIR1 and DIR2.

The operation will now be described in detail referring to FIGS. 8 through 12.

Stepping motor 1 is driven from a start point ST (See FIG. 8) to a desired end point DP through an acceleration control stage ACC, a deceleration control stage DEC, a constant speed control stage CON and a brake control stage BRK. The brake control stage BRK includes a first deceleration control period BR1 a free-running control period BR2, a second deceleration control period BR3, and a stopping control period BR4.

Stepping motor 1 is held stationary at a stable point by continuous excitation of a single phase winding. The operation of stepping motor 1 during the acceleration stage ACC will be described with reference to FIG. 9 and based on the assumption that stepping motor 1 has been held stationary with its rotor R confronting, for example, excitation pole C carrying phase winding C. Starting from the stationary state with phase winding C being energized, electronic control circuit 2 issues a drive signal, as a start signal, to stepping motor 1 in response to input command signal CS for the number of steps, so that phase windings D and A are energized and a magnetic field is produced at a middle point between excitation poles D and A. Subsequently, when rotor R has reached a point 0.75 step before the stable point corresponding to the D-A phase excitation, control circuit 2 switches the windings to be energized from windings D and A to windings A and B, in response to position signal RC issued from detecting circuit 3. The above mentioned stable point corresponds to the middle point between excitation poles D and A, and the detecting circuit 3 produces a rectangular wave-form signal for each one step movement of rotor R. The term "one-step" means an interval between adjoining stable stopping points in either a 1-phase excitation system or a 2-phase excitation system and equals an interval between each adjoining excitation pole in the drawing. In this manner, during the acceleration stage ACC, two phase windings to be energized, are switched sequentially in a 2-phase excitation system, such that a magnetic field for driving rotor R may be produced at a position between 0.75 step and 1.75 steps leading the current position of rotor R.

Figure 8:
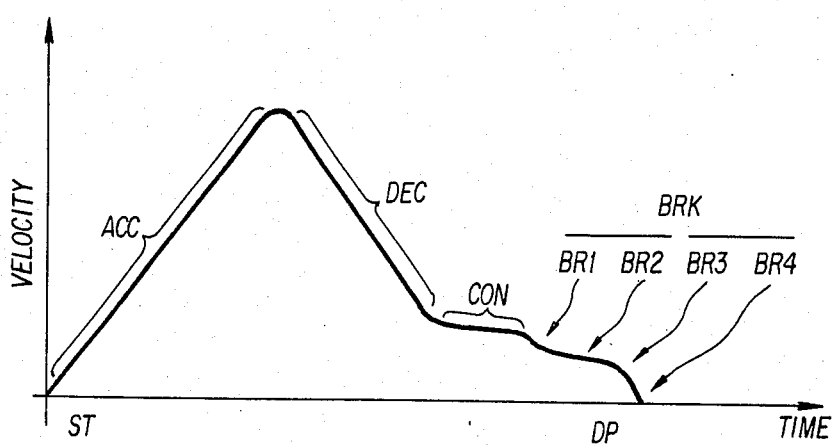
FIG. 8 depicts a graphical diagram showing the speed characteristic curve of the stepping motor in the system depicted in FIGS. 1 and 2.
Figure 9:
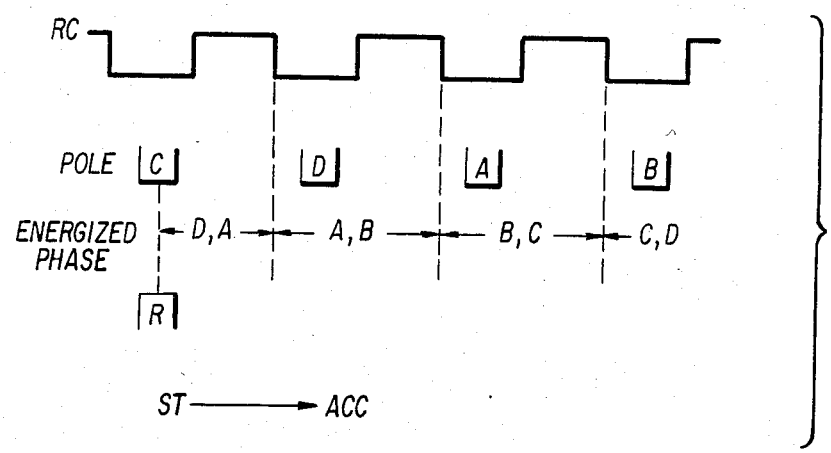
FIGS. 9, 10, 11, and 12 depict timing charts explaining control of the stepping motor in the system depicted in FIGS. 1 and 2.

Next, a transition from the acceleration stage ACC, to the deceleration stage DEC will be described with reference to FIG. 10. Electronic control circuit 2 selects a speed characteristic curve as shown in FIG. 8, depending on the number of steps designated by the command signal CS so as to determine the switching point from the acceleration control stage ACC to the deceleration control stage DEC and at the same time, counts the number of steps by which stepping motor 1 has actually moved on the basis of a position signal RC from detecting circuit 3 so that drive control is transferred to the deceleration control stage DEC when rotor R has reached the switching point.

Figure 10:
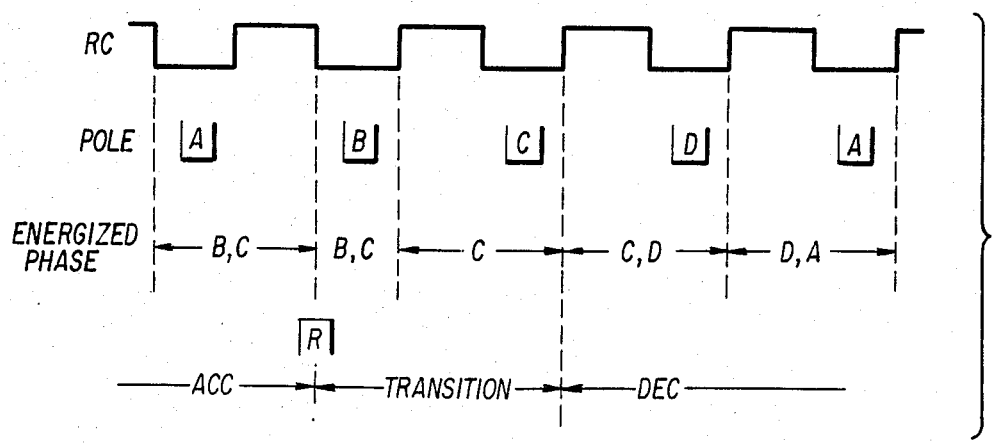

When rotor R reaches the switching point with phase windings B and C being energized as shown in FIG. 10 electronic control circuit 2 continues to energize phase windings B and C for 0.5 step period in addition to the one step excitation, then energizes only phase winding C in the following 1 step period. When rotor R, by energization of phase winding C, has reached a point 0.25 step before the middle point between poles C and D, that is, the stable point corresponding to the C-D phase excitation, electronic control circuit 2 starts to energize phase windings C and D, and when rotor R has passed the stable point corresponding to the C-D phase excitation by 0.75 step, control circuit 2 switches windings to be energized from windings C and D to winding D and A. In this manner, in the deceleration control stage DEC, two phase windings to be energized are switched sequentially in a 2-phase excitation system, such that a magnetic field for driving rotor R may be produced within the range of from a 0.25 step lead point to a 0.75 step lag point relative to the position of rotor R.

Transition from deceleration control stage DEC to the constant speed control stage shown by CON in FIG. 8 takes place when electronic control circuit 2 has sensed that the speed of rotor R has fallen below a specified speed. This speed is detected by checking that the level of the above mentioned position signal RC does not change over a specified period. Initiation of the constant speed control stage CON differs depending on the level of the abovementioned position signal RC at the time when the specified speed is sensed. If rotor R has reached the specified speed with position signal RC being at a high level as shown on the upper side of ENERGIZED PHASE period in FIG. 11, excitation is switched from phase windings B and C which have been energized to only phase winding C, then excitation is switched to phase winding D at a time T after rotor R reaches a position 0.25 step before it is in line with the excitation pole C. After rotor R arrives at a position lagging by 0.25 step to the excitation pole carrying the phase winding energized by a 1-phase excitation system and then the time T has elapsed, the excitation is switched to a subsequent one phase winding.

Figure 11:
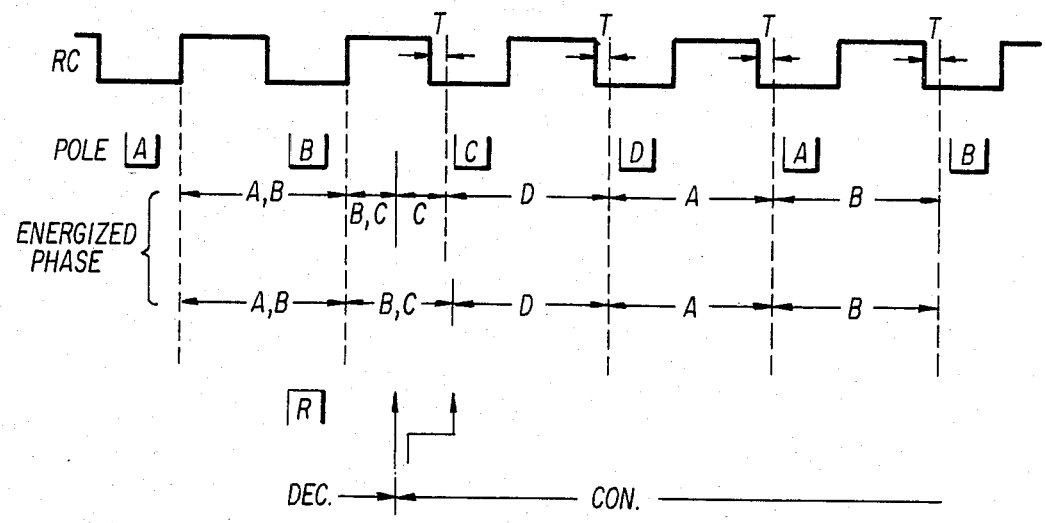

If rotor R has reached the specified speed with position signal RC being at a low level as shown on the lower side of ENERGIZED PHASE period in FIG. 11, control circuit 2 initiates energization of only phase winding D immediately from the position, and thereafter, one phase winding is sequentially energized by the 1 phase excitation system in the same timing of switching as mentioned above. In the constant speed control stage CON, electronic control circuit 2 switches phase winding time T after rotor R reaches a position lagging the current phase by 0.25 step. Time T is set such that rotor R is maintained at substantially the maximum speed within the range required to stop rotor R smoothly in the subsequent brake control stage BRK, as will be described hereinafter. The constant speed control stage CON itself is provided for maintaining the speed of rotor R at a substantially constant speed as a preceding stage for a smooth deceleration in the following brake control stage BRK.

Figure 12:
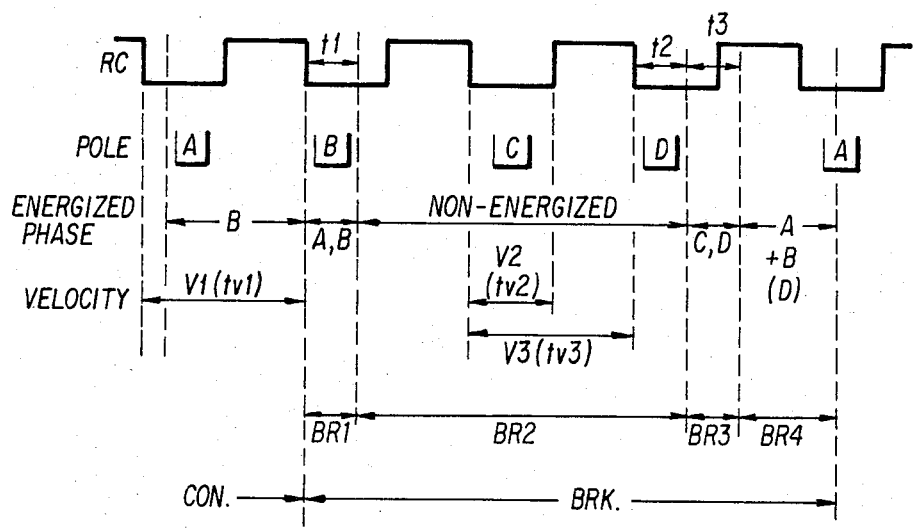

The transition from the constant speed control stage CON to the brake control stage BRK is carried out when electronic control circuit 2 detects that rotor R has reached a position 3.25 steps before the desired end position corresponding to the number of steps given by command signal CS, as shown in FIG. 12. In the final one step period of the constant speed control stage CON, which precedes the brake control stage BRK, electronic control circuit 2 measures the average velocity V1 in the period. In the first deceleration control period BR1 of the brake control stage BRK, as mentioned in the discussion of FIG. 8, electronic control circuit 2 causes application of a braking force to rotor R by simultaneously energizing two phase windings A and B, with their corresponding stable point being already passed by rotor R for a period t1 which is calculated to be corresponding to the previously measured velocity V1.

In the free running control period BR2 following the first deceleration control period BR1, electronic control circuit 2 suspends energization of all of the excitation phase windings of stepping motor R which was once provided with a braking force in the first deceleration control period BR1, to free run. After rotor R has reached a position 2.25 steps before the desired end position, electronic control circuit 2 measures average velocity V2 and V3 of rotor R in the 0.5 step and 1 step periods, respectively. When rotor R has reached a position 1.25 steps before the desired end position, rotor R is kept free running for a period t2 which is calculated on the basis of average velocity V2 and V3. After that, drive control is transferred to the second deceleration control period BR3.

During the second deceleration control period BR3, electronic control circuit 2 decelerates rotor R to a speed, at which rotor R can stop in the final stopping control period BR4 by energizing two phase windings C and D, with their corresponding stable point being already passed by rotor R for a period t3 which is calculated on the basis of average velocity V3.

In the stopping control period BR4 electronic control circuit energizes excitation phase winding A which corresponds to the desired end position. If the speed of rotor R is higher than the specified value, electronic control circuit 2 selectively energizes excitation phase winding B or D in a chopping mode. That is, when rotor R approaches the desired point by being pulled to the final phase winding A with unwanted oscillation around the desired end position, excitation phase winding B or D is selectively energized in a chopping mode depending on the speed and moving direction of rotor R so that a braking force is produced in a direction opposite to the moving direction, thereby stopping rotor R at the desired end position. Thus, after rotor R has slowed down below the specified speed, it is stopped and held at the desired end position only by energization of the phase winding A.

Figure 13A:
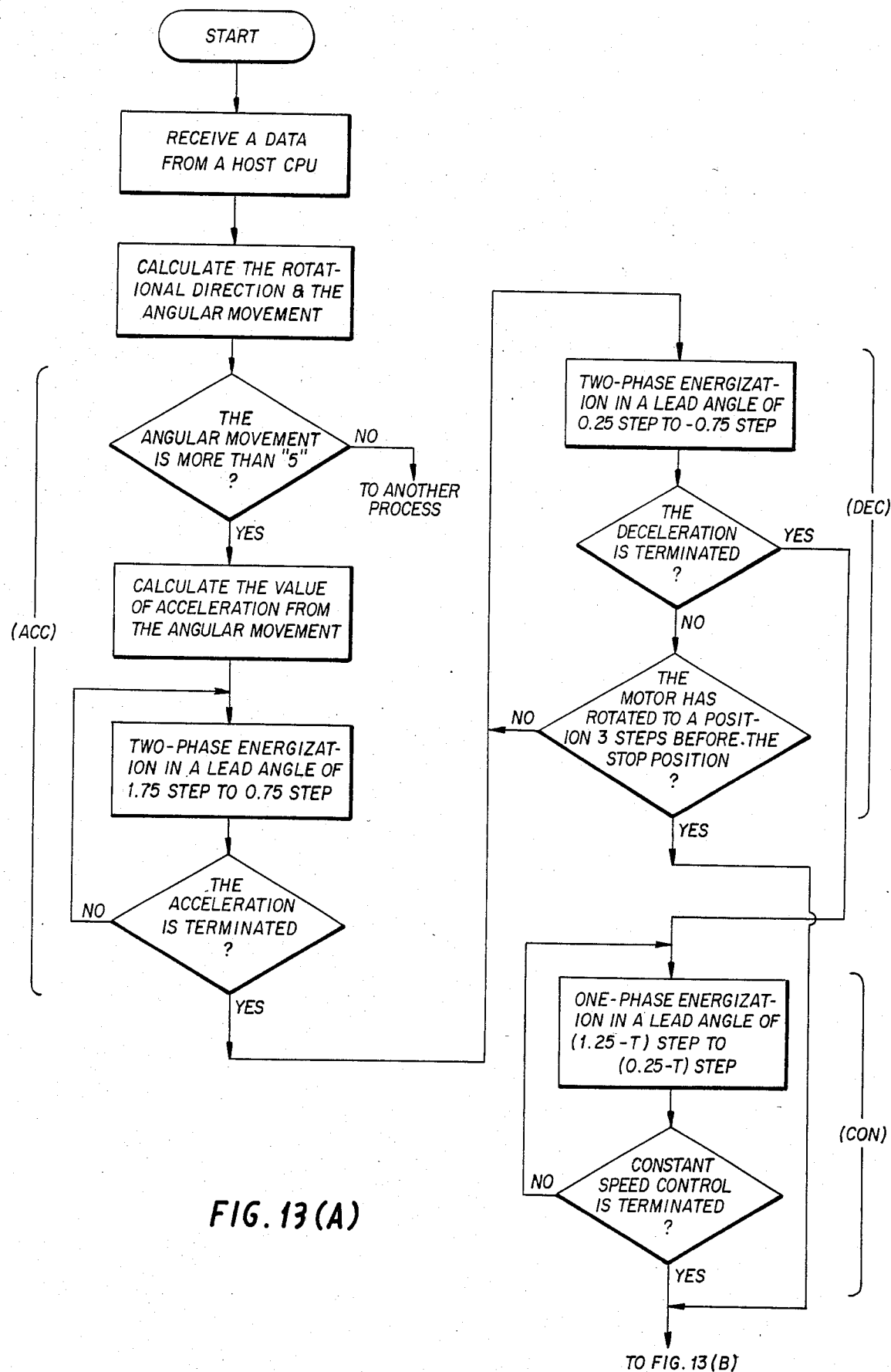
FIG. 13 depicts a flow chart showing the operation of the invention.
Figure 13B:
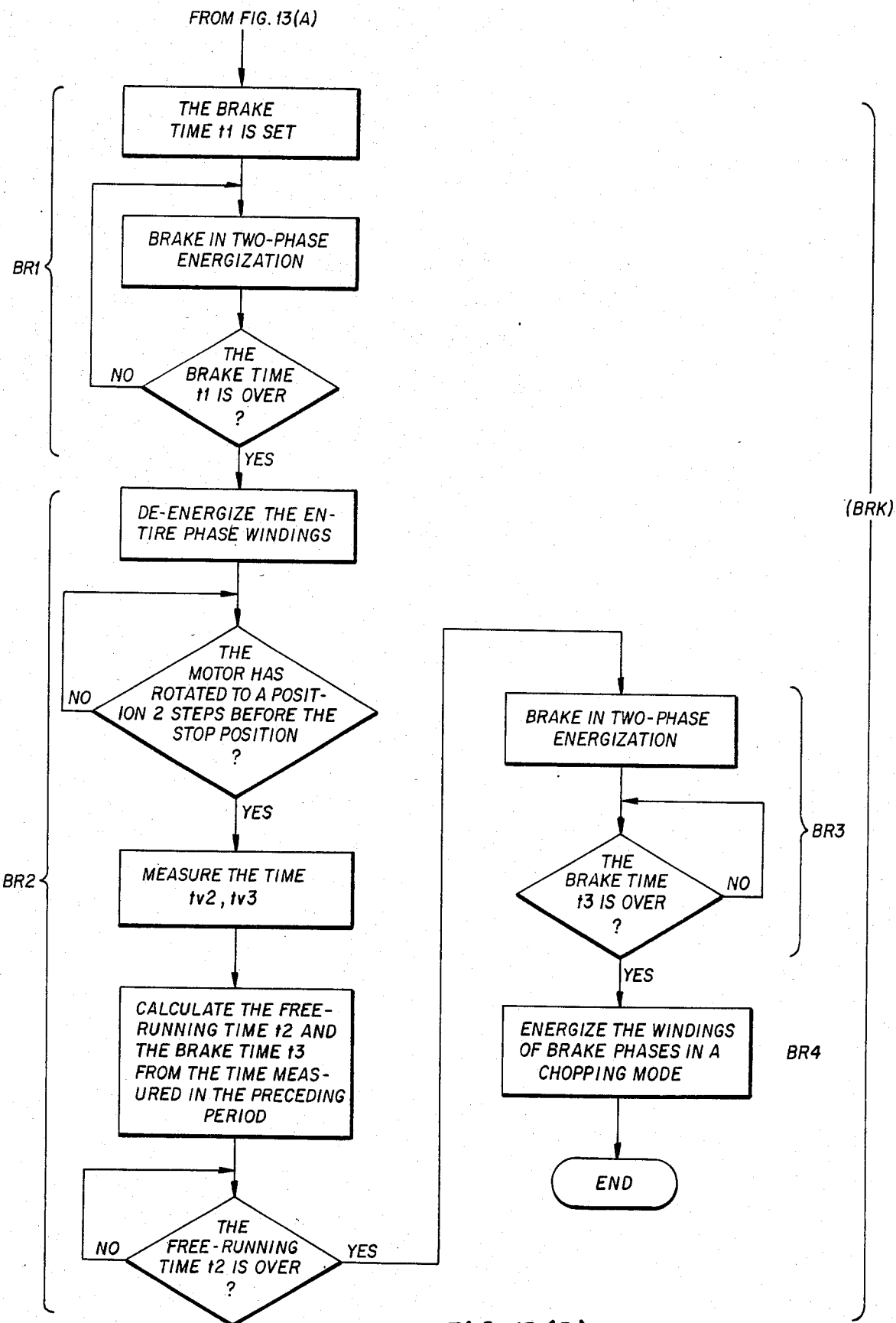

The operation described above is graphically represented in flow chart of FIG. 13, wherein the control action is divided into four blocks, as follows.

ACCELERATION CONTROL STAGE "ACC"

Two phase energization is executed in this stage for a lead angle of 1.75 step to 0.75 step. The acceleration is terminated when stepping motor 1 has rotated correspondingly to the value of acceleration (step of motor) calculated from the angular movement.

DECELERATION CONTROL STAGE "DEC"

Two phase energization is executed for a lead angle of 0.25 step to −0.75 step. The deceleration is terminated when the rotational speed of the stepping motor has been reduced below the predetermined value (700 steps/sec). In case the rotation of stepping motor 1 is advanced to brake control stage "BRK" (about 3 steps anterior to the stop position) during the continuation of the deceleration state, the control action is transferred immediately to brake control stage "BRK" with omission of the constant speed control stage "CON".

CONSTANT SPEED CONTROL STAGE "CON"

One phase energization is executed for a lead angle of (1.25-T) step to (0.25-T)step. This stage is terminated when stepping motor 1 has rotated to a position about three steps before the stop position.

BRAKE CONTROL STAGE "BRK"

This stage is divided into the following four periods.

(A) FIRST DECELERATION CONTROL PERIOD "BR1"

Brake time t1 is calculated from time tv1 measured in preceding constant speed control stage "CON" (time required for an angular movement of one step), and a braking force is exerted during time t1 in a two phase energization mode.

(B) FREE RUNNING CONTROL PERIOD '"BR2"

After lapse of time t1, the plurality of phase windings A,B,C and D of stepping motor 1 are deenergized. The time is measured with phase windings A,B,C and D of stepping motor 1 kept deenergized continuously. The deenergized state is maintained in this stage for eliminating any harmful effect that may otherwise result from variation in the torques related to the energized phases of stepping motor 1. Measured in this period are low level time tv2 of signal RC and its one cycle time tv3. Free running time t2 is calculated from time tv2, tv3 and stepping motor 1 is rotated during time t2 with phase windings A,B,C and D kept deenergized.

(C) SECOND DECELERATION CONTROL PERIOD "BR3"

Two windings, serving as brake phases, are energized during brake time t3 (calculated from tv2 and tv3 measured in the preceding period).

(D) STOPPING CONTROL PERIOD "BR4"

In this period, the windings of the brake phases are energized in a chopping mode so as to weaken the torques exerted against the rotation of stepping motor 1 in the vicinity of the stop position.

Referring now to FIGS. 14A through 17K, a further more detailed explanation will now be given on the constant speed control stage "CON" and succeeding stages.

(I) CONSTANT SPEED CONTROL STAGE "CON"

(A) In this stage, the rotational speed of stepping motor 1 is stablized to be rendered readily controllable in the next brake control stage "BRK".

Figure 14A:
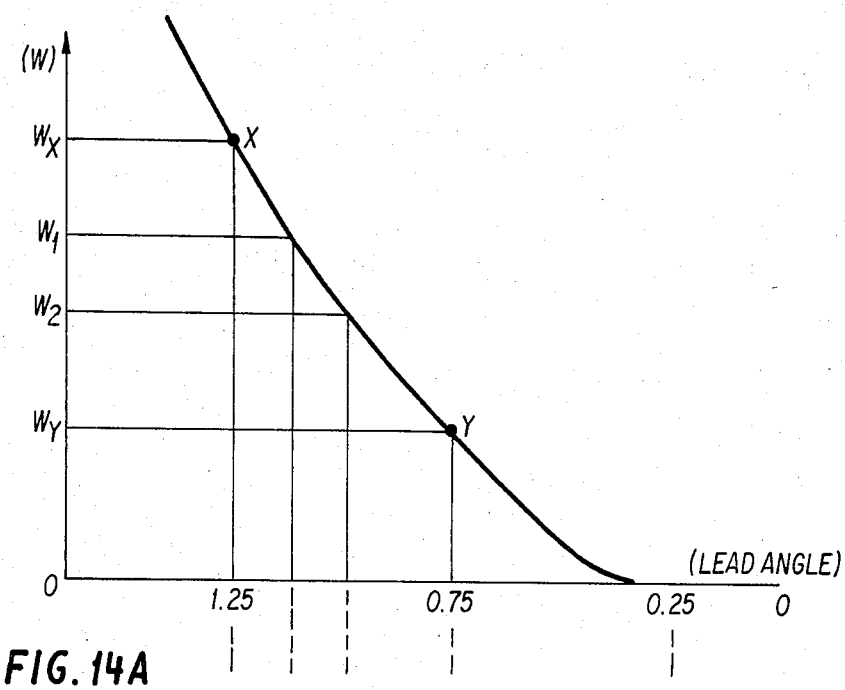
FIGS. 14A, 14B, 15A, and 15B depict graphs showing switchover of energized phases at the time of deceleration of the stepping motor.
Figure 14B:
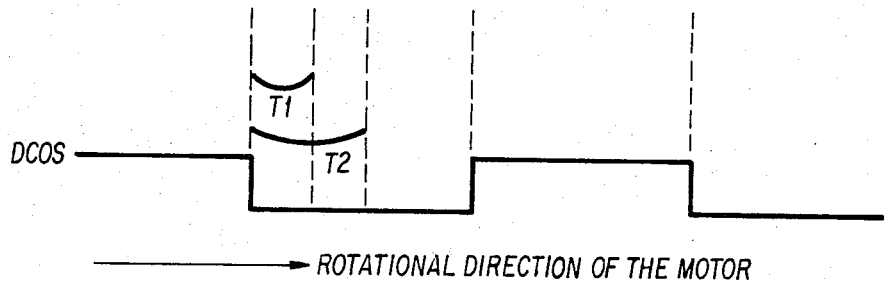

(B) As the timing for switching the energized phases of stepping motor 1 is limited merely to the leading or trailing edge of position signal RC, it is impossible to freely control the rotational speed of stepping motor 1 at such moment. In FIGS. 14A and 14B, when the energized phases are switched synchronously with the edge of the position signal RC, the lead angle becomes 1.25 or 0.75 step so that the rotation of stepping motor 1 is stabilized at velocities WX and WY represented by points X and Y in the figures, and any intermediate velocity is not attainable. However, in next brake control stage "BRK", velocity WX is higher than the normal value while velocity WY is lower than that, and an intermediate velocity therebetween is desired. Therefore, the aforementioned delay time T1 is introduced for adjusting the lead angle within a range of 0.75 to 1.25 steps so as to attain a desired angular velocity W1. It is a matter of course that introduction of a delay time T2 (>T1) causes the stable angular velocity to become W2 (<W1).

II. BRAKE CONTROL STAGE "BRK"

Figure 15A:
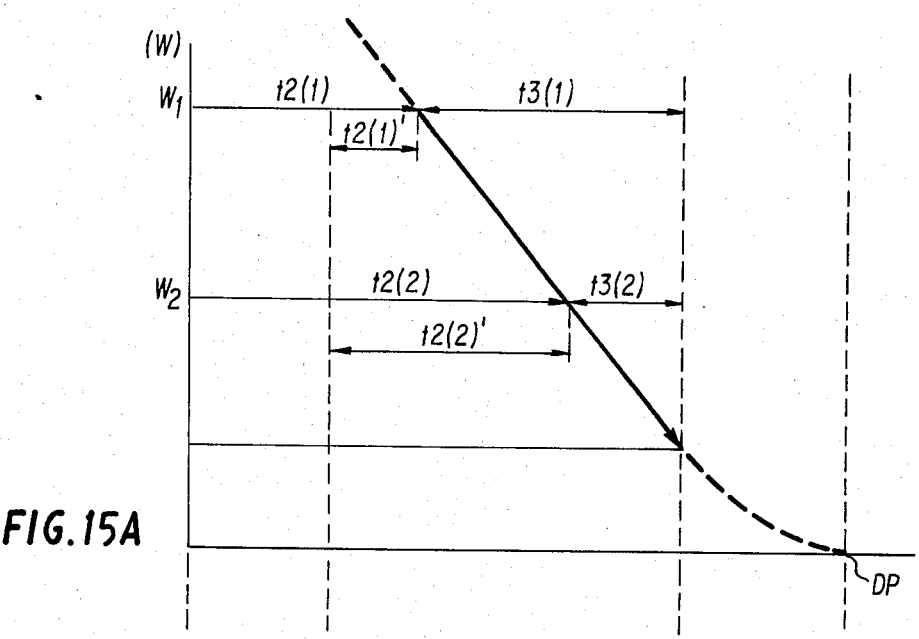

(A) As already described in connection with the flow chart of FIG. 13, this stage is divided into four periods. First, an explanation will be given on the second deceleration period "BR3", with reference to FIGS. 15A and 15B. In FIG. 15A a velocity characteristic curve is graphically plotted with an angular velocity taken along the ordinate and a position along the abscissa. The curve extending from an upper left region toward a lower right region represents the deceleration characteristic obtained with a braking action. According to the fundamental principle, any variation existing in the approach angular velocity to this period is absorbed, and the operation is advanced to the next stopping control period "BR4" while the angular velocity is regulated along the deceleration curve. That is, the action in this period "BR3" is executed for the purpose of stabilizing the approach velocity to the stopping control period "BR4". Thus, in accordance with the approach velocity to this period, the free running time t2 is also determined in addition to the brake time t3.

Figure 15B:
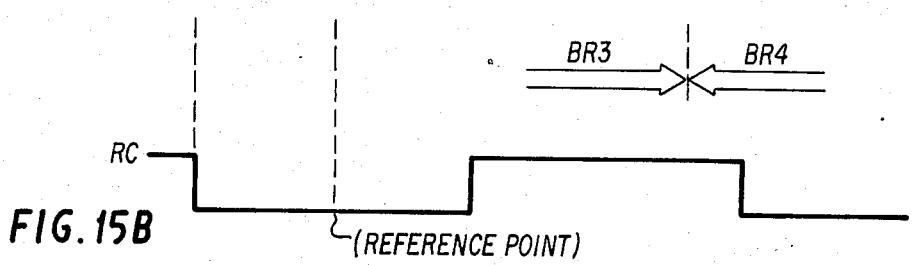

When the approach velocity is W1 in FIGS. 15A and 15B, it signifies that the velocity is regulated along the deceleration curve with the free running time set to t2(1), and then a desired approach velocity to stopping control period "BR4" is attained with brake time set to t3(1) in second deceleration control period "BR3". The same action is executed also when the approach velocity is W2.

Figure 16A:
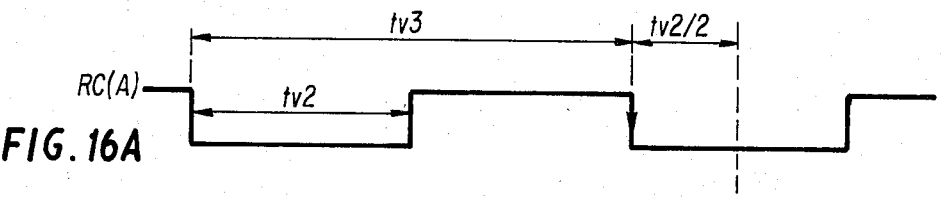
FIGS. 16A and 16B depict timing charts explaining measurement of velocity of the stepping motor.
Figure 16B:
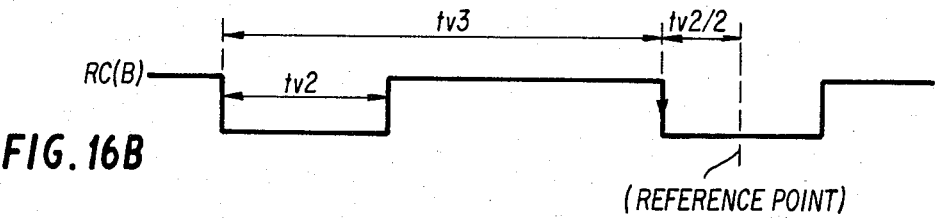

(B) Next, the free running control period "BR2" will be described with reference to FIGS. 16A and 16B. In this period, the cycle time of position signal Rc is measured for detecting the approach velocity to second deceleration control period "BR3".

The cycle time thus measured is designated tv3.

Also, the low level duration (first half) of position signal RC is measured to obtain a time tv2, which is used for the following purpose. There arises a problem in case the duty ratio is unsatisfactory as in the position signal RC (B) of FIG. 16B.

Although the cycle time tv3 of the position signal RC remains unchanged even in this case, the trailing edge thereof comes to have a delay. As a result, the approach velocity W1 is judged to be the same, and thus the same free running time t2 and brake time t3 in the second deceleration control period "BR3" are calculated, wherein there occurs a rightward deviation of the velocity from the deceleration curve of FIG. 14A corresponding to the delay of the trailing edge. It means that the approach velocity to the stopping control period "BR4" is higher than the normal value. In order to prevent such a phenomenon, if the moment posterior to lapse of time tv2/2 from the trailing edge is regarded as a reference point, it is obvious that this point is at the center of the low level duration of position signal RC and is thus constant regardless of the duty ratio. Consequently, free running time t2 is expressed as $t2=t2'+tv2/2$, where t2' is the free running time posterior to the reference point (they are shown in FIG. 15A as t2(1)' and t2(2)'). Thus, time t2 is not dependent on the duty ratio. The phase windings are kept in a deenergized state during the time measurement for eliminating any harmful effect that may otherwise result from variation in the torques, etc, related to the energized phases.

(C) In the first deceleration control period "BR1", similar preliminary control is executed on the basis of the fundamental principle described already in connection with the preceding items (A) and (B).

The velocity is measured during the last cycle in the constant speed control stage "CON", and brake time t1 in first deceleration control period "BR1" is calculated according to the time measured.

(D) Since the rotational direction of stepping motor 1 is detectable as mentioned previously with reference to FIGS. 2 through 7, the energized phases are controlled during stopping control period "BR4" in such a manner as to generate torques reverse to the rotational direction of stepping motor 1.

FIGS. 17A through 17K show signal waveforms in the damping control performed during the stopping control period "BR4" at the stop position (desired point DP). Phase C is energized at the stop position, and position signal RC has a low level in the vicinity of the stop position.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. In a system including a stepping motor having a plurality of phase windings and a rotor which is held in one of a plurality of stable stopping positions provided at intervals of one step, each of said stable stopping positions being defined by one of said phase windings, and means for driving said rotor responsive to the current rotational position of said rotor and the rotational speed of said rotor, a method comprising the steps of sequentially energizing two selected phase windings which produce a magnetic field within a first rotational range relating to the current rotational position of said rotor, whereby said rotor is accelerated until it passes through the substantially middle point in the entire distance between a start position and a desired position, sequentially energizing two selected phase windings which produce a magnetic field within a second rotational range relating to the current rotational position of said rotor, whereby said rotor is decelerated from a predetermined first position beyond said middle point to a second position where the rotational speed of said rotor drops to a predetermined value, sequentially energizing a selected phase winding which produces a magnetic field within a third rotational range relating to the current rotational position of said rotor, whereby the rotational speed of said rotor is kept at substantially said predetermined value until said rotor arrives at a predetermined third position, in several steps, before said desired position, selectively energizing two selected phase windings for a period determined by the rotational speed of said rotor in order to brake said rotor approaching said desired position, and supplying a final drive signal to only one phase winding corresponding to said desired position in order to stop and hold said rotor at said desired position.

2. The method of claim 1, wherein said first rotational range is between 0.75 step and 1.75 steps leading the current position of said rotor, said second rotational range is between 0.25 leading and 0.75 lagging the current position of said rotor, and said third rotational range is substantially between 0.25 step and 1.25 step leading the current position of said rotor.

3. The method of claim 1, wherein said means also drives said rotor in response to the rotational direction of said rotor, and the step of supplying a final drive signal comprises: concurrently supplying a brake signal alternately to a selected one of a plurality of non-energized phase windings at said desired position to produce a torque which tends to rotate said rotor in the reverse direction at each time when said rotor changes its rotational direction around said desired position.

4. The method of claim 1, wherein the step of selectively energizing, comprises energizing two selected phase windings for causing production of a magnetic field behind a position through which said rotor has just passed, whereby said rotor is braked for a first period determined by the rotational speed of said rotor in one step before said third position, suspending energization of said phase windings so that said rotor is rotatable only due to its inertia, whereby said rotor gets to a predetermined fourth position and thereafter freely runs for a second period determined by the rotational speed of said rotor in intervals just before said fourth position, and energizing two selected phase windings for causing production of a magnetic field behind a position through which said rotor has just passed, whereby said rotor is braked for a third period determined by the rotational speed of said rotor in an interval just before said fourth position.

5. The method of claim 4, wherein said first rotational range is between 0.75 step and 1.75 steps leading the current position of said rotor, said second rotational position is between 0.25 step leading and 0.75 lagging the current position of said rotor, and said third rotational range is substantially between 0.25 step and 1.25 steps leading the current position of said rotor.

6. The method of claim 5, wherein said means also drives said rotor in response to the rotational direction of said rotor, and the step of supplying a final drive signal comprises: concurrently supplying a brake signal alternately to a selected one of a plurality of nonenergized phase windings at said desired position to produce a torque which tends to rotate said rotor in the reverse direction at each time when said rotor changes its rotational direction around said desired position.

7. A system comprising a stepping motor having a plurality of phase windings and a rotor which is held in one of a plurality of stable stopping positions provided at intervals of one step, each of said stable stopping positions being defined by one of said phase windings, first means for detecting the current rotational position of said rotor in order to produce position signals indicating a plurality of predetermined rotational positions of said rotor, and second means for coupling said motor and said first means in order to drive said rotor toward a desired position responsive to said position signals, said second means sequentially energizing two selected phase windings which produce a magnetic field within a first rotational range relating to the current rotational position of said rotor, whereby said rotor is accelerated until it passes through substantially the middle point in the entire distance between a start position and a desired position, said second means sequentially energizing two selected phase windings which produce a magnetic field within a second rotational range relating to the current rotational position of said rotor, whereby said rotor is decelerated from a predetermined first position beyond said middle point to a second position where the rotational speed of said rotor drops a predetermined value, said second means sequentially energizing a selected phase winding which produces a magnetic field within a third rotational range relating to the current rotational position of said rotor, whereby the rotational speed of said rotor is kept at substantially said dropped value until said rotor arrives at a predetermined third position in several steps before said desired position, said second means selectively energizing two selected phase winding for a period determined by the rotational speed of said rotor in order to brake said rotor approaching said desired position, said second means supplying a final drive signal to only one phase winding corresponding to said desired position in order to stop and hold said rotor at said desired position.

8. The system of claim 7, wherein said first rotational range is between 0.75 step and 1.75 steps leading the current position of said rotor, said second rotational range is between 0.25 step leading and 0.75 step lagging the current position of said rotor, and said third rotational range is substantially between 0.25 step and 1.25 steps leading the current position of said rotor.

9. The system of claim 7, wherein said first means also produces direction signals indicating the rotational direction of said rotor, and second means selectively and alternatively supplies a brake signal to a selected one of a plurality of nonenergized phase windings at said desired position in response to said direction signals while a final drive signal is supplied to said motor, whereby said selected nonenergized phase winding produces a torque which tends to rotate said rotor in the reverse direction at each time when said rotor changes its rotational direction around said desired position.

10. The system of claim 7, wherein said second means energizes two selected phase windings for causing production of a magnetic field behind a position through which said rotor has just passed, so that said rotor is braked for a first period determined by the rotational speed of said rotor in one step before said third position, then suspend energization of said phase windings so that said rotor is rotatable only due to its inertia, whereby said rotor gets to a predetermined fourth position and thereafter freely runs for a second period determined by the rotational speed of said rotor in intervals just before said fourth position, and then energize two selected phase windings for causing production of a magnetic field behind a position through which said rotor has just passed, whereby said rotor is braked for a third period determined by the rotational speed of said rotor in an interval just before said fourth position.

11. The system of claim 10, wherein said first rotational range is between 0.75 step and 1.75 steps leading the current position of said rotor, said second rotational range is between 0.25 step leading and 0.75 step lagging the current position of said rotor, and said third rotational range is substantially between 0.25 step and 1.25 steps leading the current position of said rotor.

12. The system of claim 11, wherein said first means also produces direction signals indicating the rotational direction of said rotor, and second means selectively and alternatively supplies a brake signal to a selected nonenergized phase winding at said desired position in response to said direction signals while a final drive signal is supplied to said motor, whereby said selected nonenergized phase winding produces a torque which tends to rotate said rotor in the reverse direction at each time when said rotor changes its rotational direction around said desired position.

* * * * *